United States Patent
Dziurda et al.

(10) Patent No.: US 10,232,291 B2
(45) Date of Patent: Mar. 19, 2019

(54) AUTOMATIC TRANSMISSION CENTRIFUGAL DEBRIS TRAP

(71) Applicant: GM Global Technology Operations LLC, Detroit, MI (US)

(72) Inventors: Robert Alan Dziurda, Waterford, MI (US); Jonathan Tyler Caulton, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1473 days.

(21) Appl. No.: 14/036,537

(22) Filed: Sep. 25, 2013

(65) Prior Publication Data

US 2014/0116963 A1    May 1, 2014

Related U.S. Application Data

(60) Provisional application No. 61/721,163, filed on Nov. 1, 2012.

(51) Int. Cl.
*B01D 35/00* (2006.01)
*F16H 57/04* (2010.01)

(52) U.S. Cl.
CPC ....... *B01D 35/005* (2013.01); *F16H 57/0404* (2013.01); *F16H 57/0484* (2013.01)

(58) Field of Classification Search
None
See application file for complete search history.

(56) References Cited

U.S. PATENT DOCUMENTS

| | | | | | |
|---|---|---|---|---|---|
| 1,361,243 | A | * | 12/1920 | Fuson | B01D 35/005 |
| | | | | | 210/305 |
| 1,623,728 | A | * | 4/1927 | Hooton | F16N 39/06 |
| | | | | | 184/6.24 |
| 1,761,930 | A | * | 6/1930 | McCuen | F01M 11/0004 |
| | | | | | 184/6.24 |
| 1,802,847 | A | * | 4/1931 | Stolte | F01M 11/0004 |
| | | | | | 210/167.02 |
| 2,539,820 | A | * | 1/1951 | Duchesneau | B60K 15/03 |
| | | | | | 137/112 |
| 3,165,468 | A | * | 1/1965 | Strader | B01D 21/02 |
| | | | | | 210/172.2 |
| 3,168,468 | A | * | 2/1965 | Jagdmann | F15B 21/041 |
| | | | | | 184/6.24 |

(Continued)

FOREIGN PATENT DOCUMENTS

| | | |
|---|---|---|
| CN | 1962022 A | 5/2007 |
| DE | 4130629 A1 | 3/1993 |

(Continued)

*Primary Examiner* — Robert J Popovics

(57) ABSTRACT

A centrifugal debris trap is provided for collecting debris within various parts of the transmission. The debris trap includes a porous material that disposed in various parts of the transmission. For example, the debris trap may be located within or on any transmission component that rotates or is stationary and that contacts automatic transmission fluid. Particular locations of the debris trap include but are not limited to the torque converter, damper, one or more clutch hubs, one or more clutch pistons, one or more clutch piston dams, including rotating hubs, rotating housings and rotating pistons, gears, gear carriers, electric motors, sprockets, bearings, and flanges.

6 Claims, 4 Drawing Sheets

(56) References Cited

U.S. PATENT DOCUMENTS

| | | | | |
|---|---|---|---|---|
| 3,210,229 A * | 10/1965 | Feine | | B01D 17/045 138/141 |
| 3,306,454 A * | 2/1967 | Webb | | B01D 35/10 210/172.3 |
| 4,395,982 A * | 8/1983 | Moller | | F01M 11/0004 123/195 C |
| 4,631,077 A * | 12/1986 | Spicer | | B01D 39/14 55/487 |
| 4,790,938 A * | 12/1988 | Younger | | B01D 29/01 210/484 |
| 4,958,653 A * | 9/1990 | Lowther | | C09K 3/00 137/13 |
| 4,966,201 A * | 10/1990 | Svec | | B22D 41/50 138/140 |
| 5,896,896 A * | 4/1999 | Rojey | | F16L 58/1009 138/177 |
| 6,732,766 B2 * | 5/2004 | Charron | | F15D 1/065 137/13 |
| 8,496,812 B2 * | 7/2013 | Beer | | F01M 11/0004 210/167.03 |
| 9,573,085 B2 * | 2/2017 | Beer | | F01M 11/0004 |
| 2007/0095738 A1 * | 5/2007 | Zhang | | B01D 35/06 210/222 |
| 2007/0287338 A1 * | 12/2007 | Miyata | | B63H 20/14 440/5 |
| 2012/0073906 A1 | 3/2012 | Brasseur et al. | | |
| 2013/0146517 A1 | 6/2013 | O'Brien | | |
| 2014/0116963 A1 * | 5/2014 | Dziurda | | F16H 57/0404 210/767 |

FOREIGN PATENT DOCUMENTS

| | | |
|---|---|---|
| DE | 102006050855 A1 | 5/2007 |
| DE | 102010041559 A1 | 3/2012 |
| DE | 102012222648 A1 | 6/2013 |

\* cited by examiner

AUTOMATIC TRANSMISSION CENTRIFUGAL DEBRIS TRAP

CROSS-REFERENCE TO RELATED APPLICATIONS

This application claims the benefit of U.S. Provisional Application No. 61/721,163, filed on Nov. 1, 2012, which is herein incorporated by reference in its entirety.

FIELD

The present invention relates to an apparatus for filtering fluid, and more specifically to a debris trap for use in an automotive transmission.

BACKGROUND

The statements in this section merely provide background information related to the present invention and may or may not constitute prior art.

A typical automatic transmission includes an electronically controlled hydraulic control circuit or system that uses a hydraulic fluid to actuate torque transmitting mechanisms, as well as to lubricate and cool the transmission. The hydraulic fluid is typically stored in a fluid reservoir, or sump, disposed at a bottom of the transmission. A pump connected to the sump is used to draw the hydraulic fluid from the sump and communicate the hydraulic fluid throughout the hydraulic control system. Engines also use fluids for lubrication and cooling, which may be filtered through a canister filter or other means.

In order to prevent damage to the control system or other components due to unwanted contaminants that may be present in the powertrain fluid, a filter is generally connected to the pump. The filter includes a filter element surrounded by a filter body having an inlet for incoming fluid and an outlet for outgoing fluid. The filter removes some of the contaminants from the fluid prior to entering the pump. In other words, the pump draws in fluid through the filter.

However, the filter only traps debris after it has returned to the sump, and some debris may pass through the filter even after the debris has collected in the sump. Accordingly, the filter is ineffective to trap debris immediately after the debris is generated and before the debris collects in the sump, or when the debris escapes from the sump. Debris can cause issues within the transmission hydraulic system. Therefore, additional debris collection apparatus or systems are desired.

SUMMARY

In an example of the present invention, a centrifugal debris trap is provided for collecting debris within various parts of the transmission. The debris trap includes a porous material that disposed in various parts of the transmission. For example, the debris trap may be located within or on any transmission component that rotates or is stationary and that contacts automatic transmission fluid. Particular locations of the debris trap include but are not limited to the torque converter, damper, one or more clutch hubs, one or more clutch pistons, one or more clutch piston dams, including rotating hubs, rotating housings and rotating pistons, gears, gear carriers, electric motors, sprockets, bearings, and flanges.

In one form, which may be combined with or separate from other forms described herein, a filtering assembly for collecting sediment particles from fluid of a powertrain device is provided. The filtering assembly includes a transmission part selected from the group consisting of: torque converter, damper, clutch hub, clutch piston, clutch housing, clutch piston dam, gear, gear carrier, electric motor, sprocket, bearing, flange, wall of pump housing, and pressure plate assembly. The filtering assembly also includes a sediment trap having a porous surface. The sediment trap is attached to the transmission part.

In another form, which may be combined with or separate from the other forms described herein, a filtering assembly for collecting sediment particles from fluid of a powertrain device is provided, and the filtering assembly includes a transmission part disposed in one of a main transmission case and a bell housing. A sediment trap having a porous surface is also provided. The sediment trap defines a plurality of pores and surrounding structures. The plurality of pores is configured to allow sediment particles to enter the sediment trap through the pores. The surrounding structures are configured to trap the sediment particles. The plurality of pores have an open cell configuration wherein the pores are interconnected with each other. The sediment trap is attached to the transmission part.

In yet another form, which may be combined with or separate from the other forms described herein, a method for collecting sediment from fluid of an automotive transmission is provided. The method includes receiving sediment particles through a porous surface of a sediment trap disposed in a cavity formed by one of a transmission case and a bell housing, wherein the porous surface of the sediment trap is configured to receive the sediment particles from transmission fluid. The method further includes trapping the sediment particles within the sediment trap.

Further examples and aspects of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DETAILED DESCRIPTION

The present disclosure provides a debris trap within rotating and non-rotating transmission components. The debris trap is comprised of one or more porous materials and is intended to catch and retain debris present in automatic transmission hydraulic systems. The debris trap may also be used in an engine or other powertrain component that uses hydraulic fluid.

Figure 1:
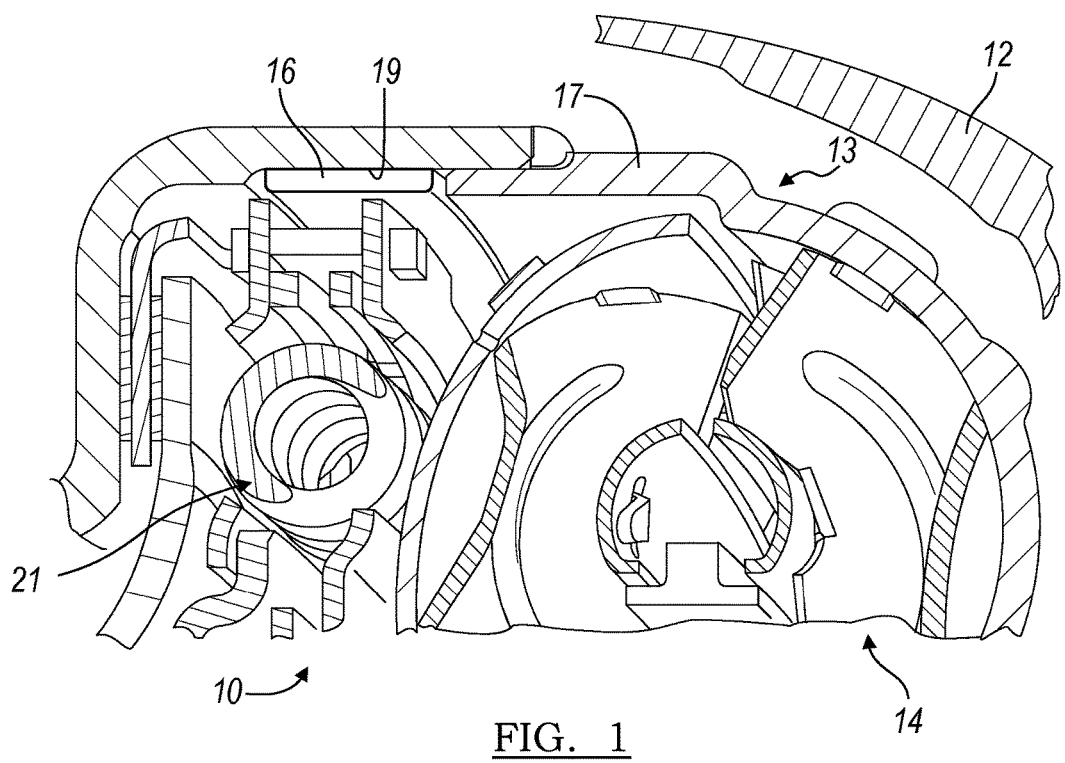
FIG. 1 is cross-sectional view of a transmission torque converter assembly having a debris trap, in accordance with the principles of the present disclosure.

Referring now, to FIG. 1, a cross-section of a portion of automatic transmission assembly 10 is illustrated. The automatic transmission assembly 10 includes a bell housing 12 attached to an end, which includes a torque converter assembly 13 including a pump housing 17 and a torque converter 14 disposed therein, wherein the pump housing 17 is rotatable with respect to the bell housing 12 as is known in the art. A debris or sediment trap 16 is disposed in the bell housing 12 to collect any debris present in automatic transmission fluid flowing past the debris trap 16. The debris trap 16 is connected to an inner surface 19 of the pump housing 17 and is disposed in radial alignment with a damper 21.

Figure 2:
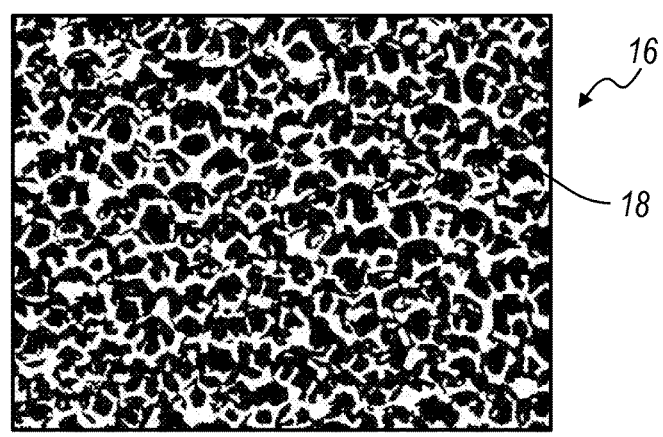
FIG. 2 is a plan view of the debris trap of FIG. 1, according to the principles of the present disclosure.

The debris trap 16 may be formed of a porous material, to collect debris. Referring to FIG. 2, the porous material may be open cell, wherein the debris trap 16 contains portions forming a plurality of pores 18 that are interconnected with each other. In the alternative, the porous material used for the debris trap 16 may have closed cell pores that are not interconnected with each other. Though the debris trap 16 is shown as solid in FIG. 1 for simplicity of illustration, it should be understood that the debris trap 16 of FIG. 1 is actually porous as illustrated more particularly in FIG. 2.

Various different materials could be used for the debris trap 16. For example, the debris trap 16 could comprise a powdered metal sintered material, which may include a ferrous material, aluminum, steel, such as stainless steel, bronze, nickel-based alloys, nickel, titanium, copper, platinum, silver, tungsten, molybdenum, and/or magnesium. The various metals may be combined with each other or other materials. The debris trap 16 could comprise a powdered metal foam material, such as a powdered aluminum foam. In one variation, the debris trap 16 could comprise a metal matrix composite (MMC) material. One example of an acceptable material for the debris trap 16 is marketed under the trademark Duocell®, which is a porous structure or open-celled foam including a network of solid struts and which may include about 5-40 pores per inch (for metals) and 5-100 pores per inch (for other materials). The debris trap 16 could also or alternatively include a plastic or composite material, a fibrous material, or another cellular structure material. In some variations, the debris trap 16 may be formed by casting or any other suitable process.

The pores 18 of the debris trap 16 may be of a uniform size throughout the debris trap 16, or the size of the pores 18 may vary with depth. For example, the debris trap 16 may have an outer layer of 100 micron diameter pores 18, a second layer immediately beneath and adjacent to the top layer of 50 micron diameter pores 18, a third layer immediately beneath and adjacent to the second layer of 25 micron diameter pores 18, a fourth layer immediately beneath and adjacent to the third layer of 10 micron diameter pores 18, and an inner layer immediately beneath and adjacent to the fourth layer having 1 or ½ micron diameter pores 18. The debris trap 16 could have any combination of the layers described, in another variation. For example, the debris trap 16 could simply have an outer layer with 25 micron diameter pores 18 and an inner layer of 1 or ½ micron diameter pores 18. In some variations, the debris trap 16 may be about 90% or more porous.

Figure 3:
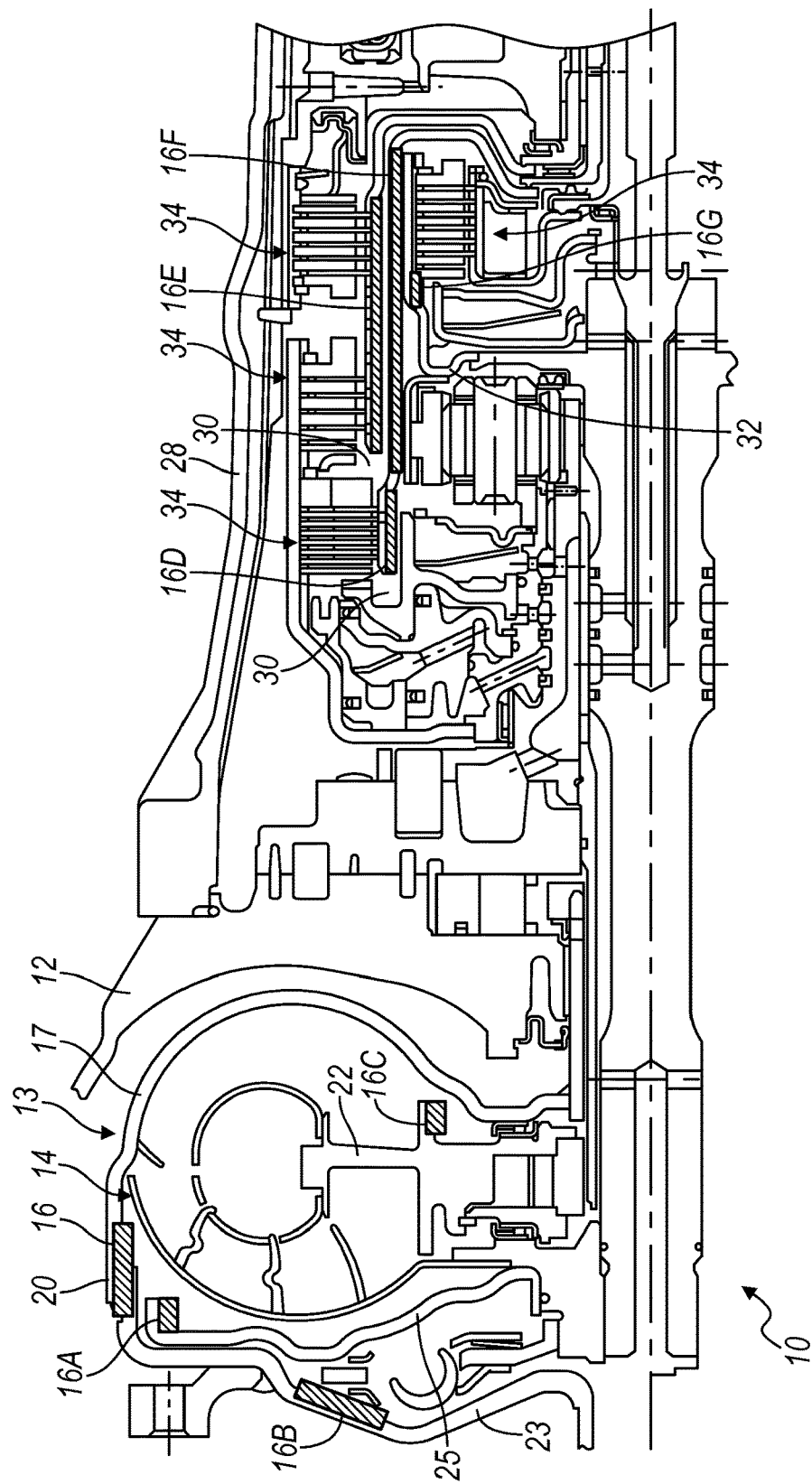
FIG. 3 is a schematic cross-sectional side view of a transmission assembly including the transmission torque converter assembly of FIG. 1, in accordance with the principles of the present disclosure.

Referring now to FIG. 3, the debris trap 16 is illustrated within the transmission assembly 10. As described above with respect to FIG. 1, the debris trap 16 is located in the torque converter 14 near the pump housing 17. The debris trap 16 is attached to a wall 20 of the pump housing 17 so that the debris trap 16 collects debris in the automatic transmission fluid that flows through the torque converter 14. Additional debris traps 16A, 16B, 16C are located in the torque converter 14, which are also configured to collect debris from the automatic transmission fluid that flows through the torque converter 14. For example, the debris trap 16C is attached to the stator 22 of the torque converter 14; debris trap 16B is attached to the converter housing cover 23; and debris trap 16A is attached to the pressure plate assembly 25. The additional debris traps 16A, 16B, 16C may be identical to the debris trap 16, or the debris traps 16A, 16B, 16C may embody any variation of the debris trap 16 described herein.

Further, additional debris traps 16D, 16E, 16F, 16G may be located inside the main transmission case 28 of the transmission assembly 10. Each of the debris traps 16D, 16E, 16F, 16G is located in or on a rotating clutch hub 30 or another rotating hub 32. The debris traps 16D, 16E, 16F, 16G are configured to collect debris from the automatic transmission fluid that flows through or around the rotating clutches 34. The additional debris traps 16D, 16E, 16F, 16G may be identical to the debris trap 16, or the debris traps 16D, 16E, 16F, 16G may embody any variation of the debris trap 16 described herein.

Figure 4:
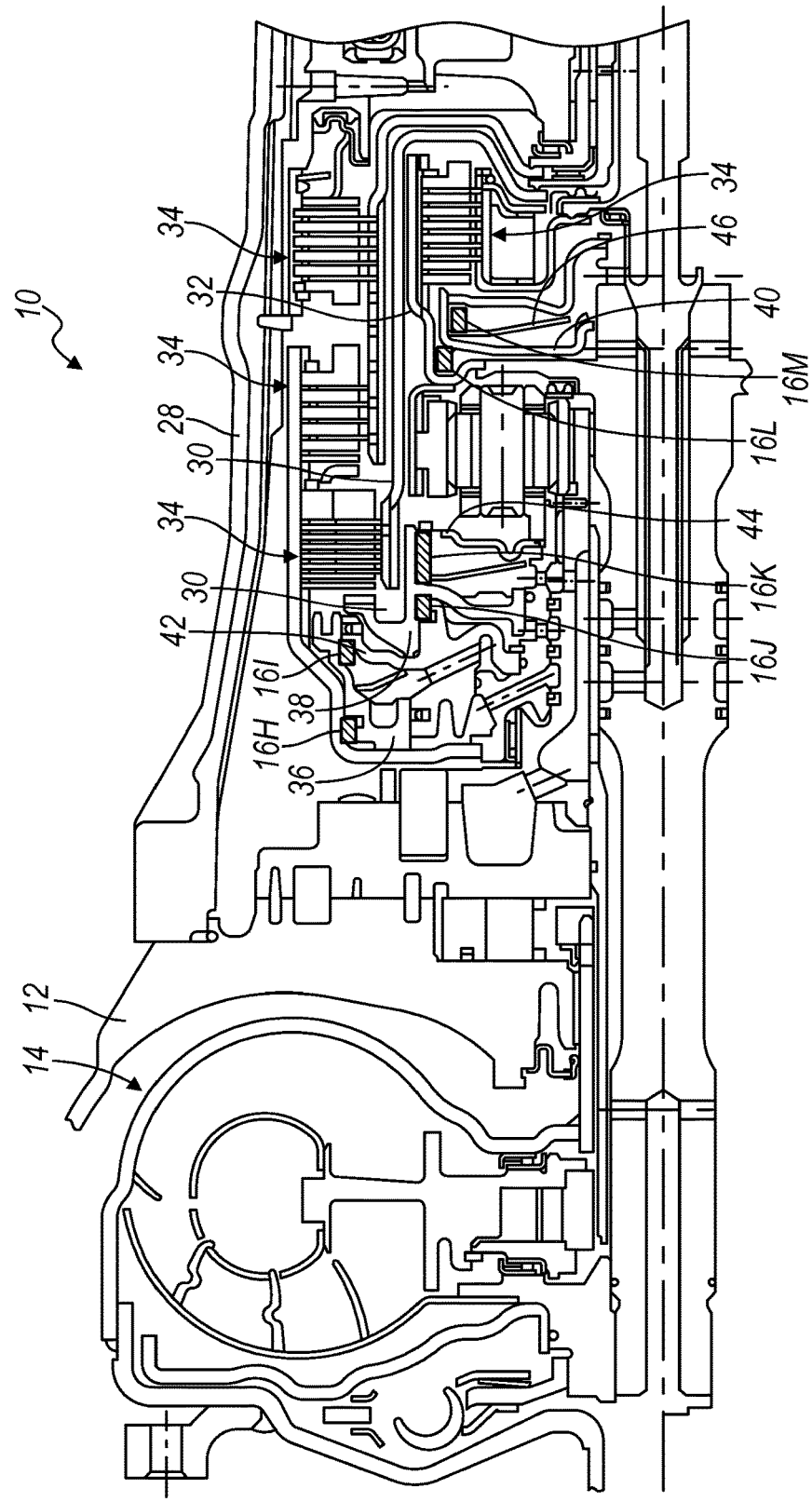
FIG. 4 is a schematic cross-sectional side view of the transmission assembly of FIG. 3, having additional debris traps, according to the principles of the present disclosure.

Referring now to FIG. 4, the transmission assembly 10 is illustrated having debris traps 16H, 16I, 16J, 16K, 16L, 16M disposed in still other locations within the transmission assembly 10. Though the previously described debris traps 16, 16A, 16B, 16C, 16D, 16E, 16F, 16G are not illustrated in FIG. 4, one having ordinary skill should understand that the earlier described debris traps 16, 16A, 16B, 16C, 16D, 16E, 16F, 16G could be disposed in the transmission assembly 10 along with the debris traps 16H, 16I, 16J, 16K, 16L, 16M. Debris traps 16H, 16J, and 16L are attached to rotating clutch pistons 36, 38, 40 or to components adjacent to the rotating clutch pistons 36, 38, 40, respectively. Debris traps 16I, 16K, and 16M are attached to rotating clutch dams 42, 44, 46, respectively. The debris traps 16H, 16I, 16J, 16K, 16L, 16M are configured to collect debris from the automatic transmission fluid that flows through the rotating clutches 34 and around and into the pistons 36, 38, 40 and dams 42, 44, 46. The additional debris traps 16H, 16I, 16J, 16K, 16L, 16M may be identical to the debris trap 16, or the debris traps 16H, 16I, 16J, 16K, 16L, 16M may embody any variation of the debris trap 16 described herein.

Figure 5:
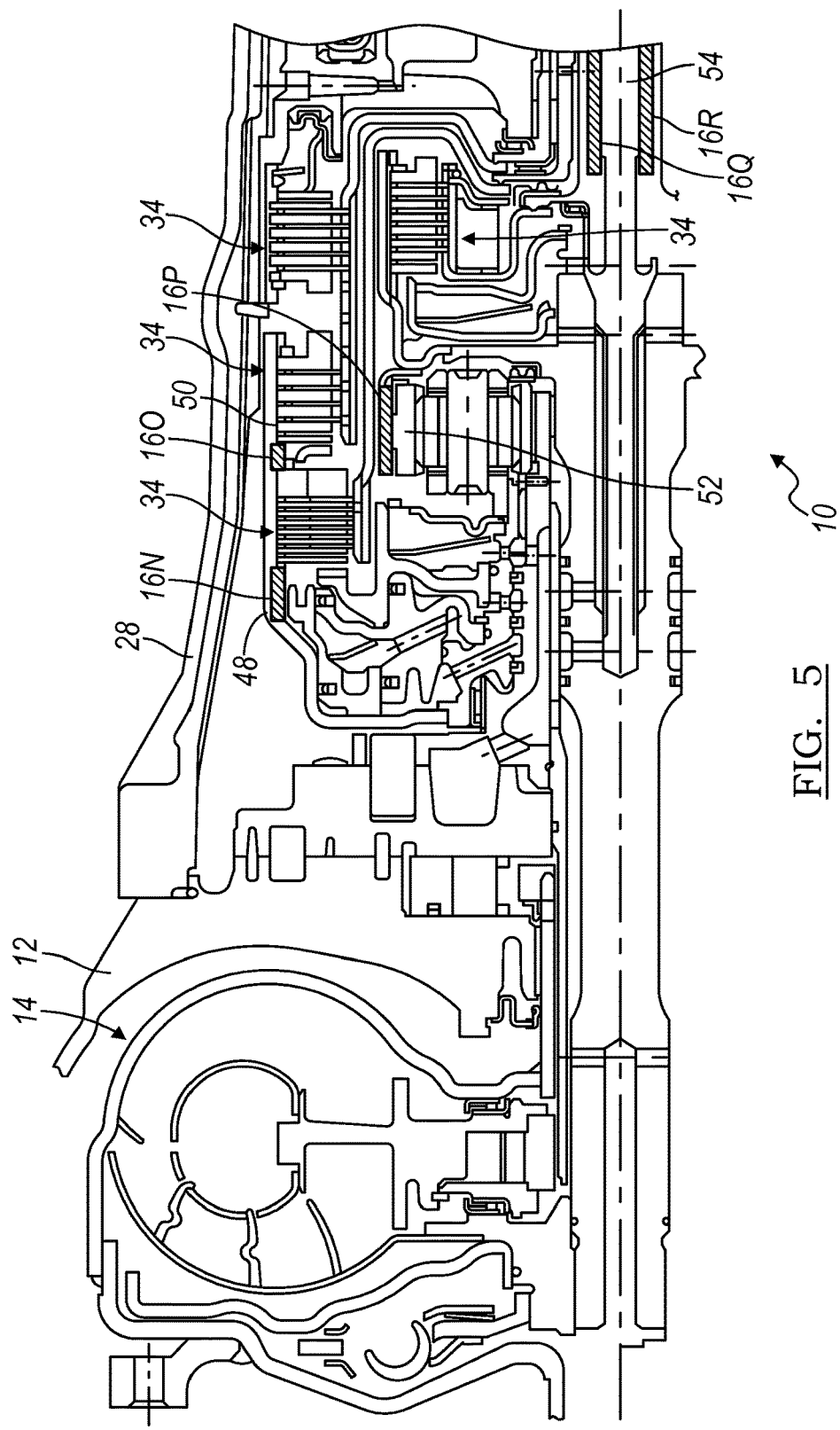
FIG. 5 is a schematic cross-sectional side view of the transmission assembly of FIGS. 3 and 4, having still additional debris traps, in accordance with the principles of the present disclosure.

Referring now to FIG. 5, the transmission assembly 10 is illustrated having debris traps 16N, 16O, 16P, 16Q, 16R disposed in still other locations within the transmission assembly 10. Though the previously described debris traps 16, 16A, 16B, 16C, 16D, 16E, 16F, 16G, 16H, 16I, 16J, 16K, 16L, 16M are not illustrated in FIG. 5, one having ordinary skill should understand that the earlier described debris traps 16, 16A, 16B, 16C, 16D, 16E, 16F, 16G, 16H, 16I, 16J, 16K, 16L, 16M could be disposed in the transmission assembly 10 along with the debris traps 16N, 16O, 16P, 16Q, 16R.

Debris traps 16N, 16O are attached to rotating clutch housings 48, 50, respectively. Debris trap 16P is attached to a rotating gear 52, which is a ring gear in this variation. Debris traps 16Q, 16R are attached to a carrier 54. The debris traps 16N, 16O are configured to collect debris from the automatic transmission fluid that flows through or around the rotating clutches 34 and through around the clutch housings 48, 50. The debris trap 16P is configured to collect debris from the automatic transmission fluid that flows past or through the ring gear 52, and the debris traps 16Q, 16R are configured to collect debris from the automatic transmission fluid that flows past or through the carrier 54.

The debris traps 16N, 16O, 16P, 16Q, 16R may be identical to the debris trap 16, or the debris traps 16N, 16O, 16P, 16Q, 16R may embody any variation of the debris trap 16 described herein.

The debris traps 16, 16A, 16B, 16C, 16D, 16E, 16F, 16G, 16H, 16I, 16J, 16K, 16L, 16M, 16N, 16O, 16P, 16Q, 16R may be centrifugal debris traps through which hydraulic fluid does not flow, but rather, debris is trapped via centrifugal force caused by rotation. In addition, or in the alternative, the debris traps 16, 16A, 16B, 16C, 16D, 16E, 16F, 16G, 16H, 16I, 16J, 16K, 16L, 16M, 16N, 16O, 16P, 16Q, 16R may be centrifugal debris filters through which fluid does flow and which strain debris via ΔP caused by rotation. Accordingly, the debris traps 16, 16A, 16B, 16C, 16D, 16E, 16F, 16G, 16H, 16I, 16J, 16K, 16L, 16M, 16N, 16O, 16P, 16Q, 16R may trap or filter debris that is built in or self-generated within a transmission assembly 10. Centrifugal forces driving the automatic transmission fluid outward may cause the fluid to flow over one or more of the debris traps, and debris to become seated or trapped therein.

The description of the invention is merely exemplary in nature and variations that do not depart from the gist of the invention are intended to be within the scope of the invention. Such variations are not to be regarded as a departure from the spirit and scope of the invention.

What is claimed is:

1. An automatic transmission assembly for collecting sediment particles from fluid in the automatic transmission assembly, the automatic transmission assembly comprising:
   a torque converter assembly having a pump housing and a torque converter each disposed within a bell housing, wherein the pump housing is rotatable with respect to the bell housing;
   a damper disposed within the pump housing; and
   a sediment trap connected to an inner surface of the pump housing and disposed in radial alignment with the damper, the sediment trap having a porous surface, wherein the sediment trap defines a plurality of pores and surrounding structures, wherein the fluid and the sediment particles enter the sediment trap through the pores and the surrounding structures trap the sediment particles as the sediment particles become seated within the sediment trap, the plurality of pores having an open cell configuration wherein the pores are interconnected with each other.

2. The assembly of claim 1, wherein the sediment trap is a centrifugal debris trap positioned so as to filter material flowing at least one of through and near the sediment trap due at least in part to centrifugal forces causing material to flow substantially outward from a rotating component.

3. The assembly of claim 1, wherein the sediment trap has a thickness, the plurality of pores comprising upper pores and lower pores within the thickness of the sediment trap, the upper pores being larger than the lower pores.

4. The assembly of claim 1, wherein the sediment trap is formed of a powdered metal foam.

5. The assembly of claim 1, wherein the sediment trap has predetermined number of pores per inch, the predetermined number being in the range of about 5 to about 40.

6. The assembly of claim 1, wherein the sediment trap has an outer layer of 100 micron diameter pores, a second layer immediately beneath and adjacent to the top layer of 50 micron diameter pores, a third layer immediately beneath and adjacent to the second layer of 25 micron diameter pores, a fourth layer immediately beneath and adjacent to the third layer of 10 micron diameter pores, and an inner layer immediately beneath and adjacent to the fourth layer having 1 or ½ micron diameter pores.

* * * * *